(No Model.)
J. J. McKANNA.
BICYCLE HOLDER.
No. 554,454.   Patented Feb. 11, 1896.
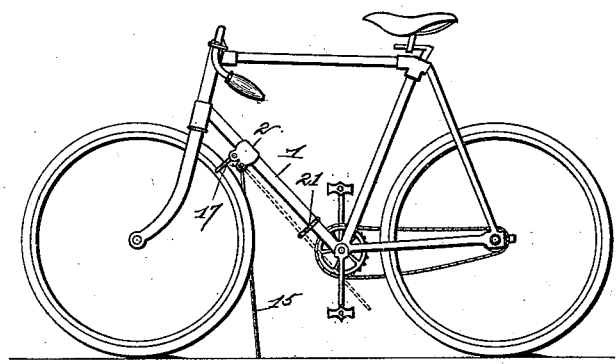
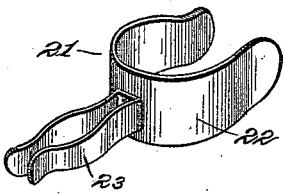
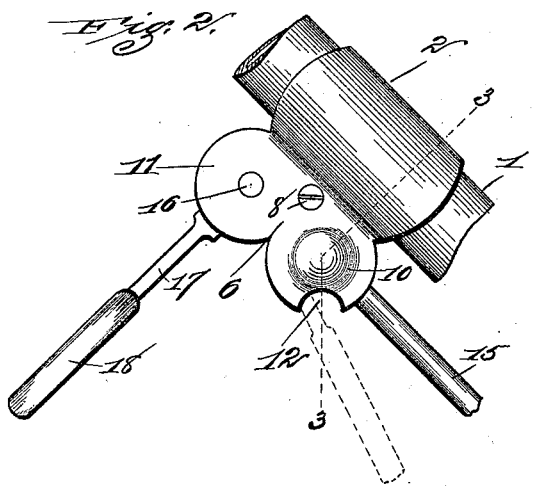
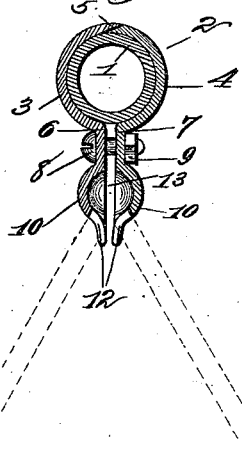
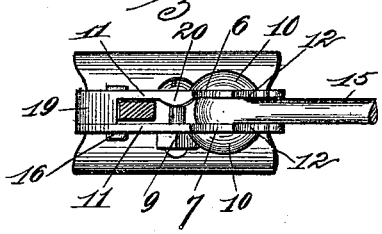
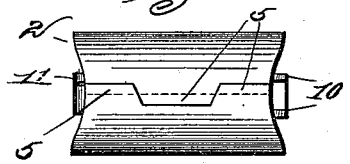
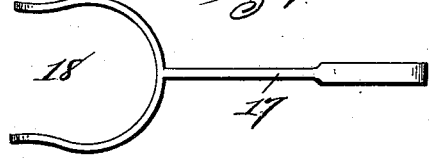
Attest
M. P. Smith
M. L. Orion
Inventor:—
John J. McKanna
by Higdon & Higdon & Longan
Atty's

UNITED STATES PATENT OFFICE.

JOHN J. McKANNA, OF HOUSTON, TEXAS.

BICYCLE-HOLDER.

SPECIFICATION forming part of Letters Patent No. 554,454, dated February 11, 1896.

Application filed March 11, 1895. Serial No. 541,210. (No model.)

*To all whom it may concern:*

Be it known that I, JOHN J. McKANNA, of the city of Houston, Harris county, State of Texas, have invented certain new and useful Improvements in Bicycle-Holders, of which the following is a full, clear, and exact description, reference being had to the accompanying drawings, forming a part hereof.

My invention relates to an improved bicycle-holder; and it consists in the novel construction, combination and arrangement of parts, hereinafter described and claimed.

In the drawings, Figure 1 is a side elevation of a bicycle, the same having my invention applied thereto. Fig. 2 is a side elevation of my improved device, the same being applied to a portion of the frame of a bicycle. Fig. 3 is a cross-sectional view taken approximately on the indicated line 3 3 of Fig. 2. Fig. 4 is a plan view of my improved device, the same being inverted. Fig. 5 is a top plan view of my improved device. Fig. 6 is a view in perspective of a double spring-clamp that is located upon the frame of a bicycle and which holds the lower end of the sustaining-rod of my device when not in use. Fig. 7 is a detail view of a bifurcated arm.

Referring by numerals to the accompanying drawings, 1 indicates that portion of the frame of a bicycle that extends downwardly and rearwardly from the front fork of the main driving or sprocket wheel, and upon said portion 1 of the frame is located a clamp 2, comprising the mating portions 3 and 4.
Said mating portions are identical in size and form, their meeting top edges being constructed with overlapping edges 5 that assist in securing said mating parts together. The upper halves of these parts 3 and 4 are bent into semicircular form of such a size as to fit tightly around the part 1 of the bicycle-frame.

Passing through the depending portions 6 and 7 of the parts 3 and 4 is a screw-bolt 8 on which is located a nut 9. By this means the parts 3 and 4 are drawn tightly together and clamped upon the part 1 of the frame. The depending portions 6 and 7 of the parts 3 and 4 are formed into mating ears 10 and 11. The ears 10 are bent into concavo-convex form, and in the lower ends of said ears are formed semicircular notches 12. Located and held for movement within the socket 13 formed between these concavo-convex ears 10 is a ball or spherical body 14 that is formed integral with the upper end of a sustaining or supporting rod 15. Thus a ball-and-socket joint or connection is formed between the sustaining-rod and the clamp 2. Pivoted by means of a pin 16 passing through the ears 11 is an arm 17, the lower end 18 of which is bifurcated and adapted to engage the tire of the front wheel of the bicycle.

A portion 19 of one of the ears 11 is bent at right angles to the main body portion thereof and contacts with the opposite ear and forms a stop for the arm 17. In front of this portion 19, that is bent over and formed integral with one of the ears 11, is a lug 20 that extends a slight distance toward the opposite ear 11.

21 indicates a double spring-clamp, one portion 22 of which is formed of a strap of resilient material bent into circular form, and said clamp is located upon that portion 1 of the bicycle-frame adjacent the lower end thereof and the driving or sprocket wheel. Formed on or fixed to the front face of this clamp 22 is a smaller spring-clamp 23 that extends downwardly and away from the portion 1 of the frame.

The operation is as follows: When my device is located upon a bicycle and said device is not in use, the rod 15 is swung so that it extends along down the portion 1 of the frame and is held in this position by being caught or engaged between the ears of the catch or clamp 23. This position of the rod 15 is clearly indicated by dotted lines in Fig. 1. The pivoted arm 17, having the bifurcated forward end, is swung downwardly to the position, as indicated by dotted lines in Fig. 2, and out of engagement with the rim or tire of the front wheel of the bicycle. When the arm 17 is thus swung downwardly, it will necessarily engage against the protruding lug 20, and in passing said lug the ears 11 will be sprung slightly apart. When said arm 17 has been swung downwardly, the ears 11 will reassume their normal position and the protruding lug 20 will hold said arm 17 from dropping into a vertical position and interfere with or engage against the rim of the front wheel. To throw the device into use in order to sustain or hold the bicycle, the front wheel of said bicycle is turned at an angle relative the rear wheel thereof and the sustaining-rod 15 is removed from the spring-catch 23 and swung downwardly into approximately a vertical plane, or until said rod 15 registers or coincides with the semicircular cut-away portions 12 of the lower portion of the ears 10. The lower end of said rod 15 is now swung laterally in either direction and allowed to engage against or come in contact with the ground or other surface. The bicycle is now leaning upon and being supported by the rod 15, and said rod therefore performs the function of a brace. The front wheel of the bicycle is now so turned as that it is in alignment with the rear wheel, and the arm 17, which has heretofore been swung downwardly and rearwardly or to the position as shown by dotted lines in Fig. 2, is manually engaged and moved upwardly. In so doing it contacts with and rides past the lug 20, and after having passed said lug 20 said arm 17 will contact with the stop or wall 19 and extend approximately at right angles to the portion 1 of the frame, and the bifurcated lower end 18 of said arm 17 will engage the rim or tire of the front wheel. The bicycle is thus held in an upright position, and the front wheel thereof is very effectually prevented from turning.

A device of this character is very compact, light in weight, and is so located upon the frame of a bicycle as not to interfere in any way with the movements of the rider or the operating parts of the bicycle.

The device can be used for properly positioning bicycles in show-windows and warerooms, and said device can be easily and quickly adjusted and manipulated.

What I claim is—

In a bicycle-holder, a pair of plates clamped upon a portion of the frame of a bicycle, two pairs of ears formed integral with and depending from said plates, one pair of ears being formed concavo-convex to form a socket between them and constructed with semicircular notches in their lower edges, a rod having a ball or spherical body on its upper end that is located and held for movement in the so formed socket, a lug formed integral with the lower end of one of the remaining pair of ears, and an arm pivoted between said remaining pair of ears, said arm having a bifurcated lower end that engages the rim or tire of the front wheel of the bicycle.

In testimony whereof I affix my signature in presence of two witnesses.

JOHN J. McKANNA.

Witnesses:
M. G. IRION,
JOHN C. HIGDON.